United States Patent
Biswas et al.

(10) Patent No.: US 6,954,764 B2
(45) Date of Patent: Oct. 11, 2005

(54) REGION MODELING OF MOBILE SERVICES

(75) Inventors: Prabuddha Biswas, Nashua, NH (US); Raja Chatterjee, Nashua, NH (US); Song Han, Nashua, NH (US)

(73) Assignee: Oracle International Corp., Redwood Shores, CA (US)

( * ) Notice: Subject to any disclaimer, the term of this patent is extended or adjusted under 35 U.S.C. 154(b) by 625 days.

(21) Appl. No.: 09/870,301

(22) Filed: May 30, 2001

(65) Prior Publication Data

US 2002/0057283 A1 May 16, 2002

Related U.S. Application Data

(63) Continuation-in-part of application No. 09/669,503, filed on Sep. 25, 2000, now Pat. No. 6,594,666.

(51) Int. Cl.[7] .............................................. G06F 7/00
(52) U.S. Cl. ........................ 707/104.1; 707/4; 707/100; 707/102
(58) Field of Search ....................... 707/1–10, 100–102, 707/104.1, 200, 106.1; 455/456.1

(56) References Cited

U.S. PATENT DOCUMENTS

| 5,839,088 | A | * | 11/1998 | Hancock et al. | 701/213 |
|---|---|---|---|---|---|
| 6,047,236 | A | * | 4/2000 | Hancock et al. | 701/208 |
| 6,085,976 | A | * | 7/2000 | Sehr | 235/384 |
| 6,202,023 | B1 | * | 3/2001 | Hancock et al. | 701/201 |
| 6,202,065 | B1 | * | 3/2001 | Wills | 707/5 |
| 6,295,502 | B1 | * | 9/2001 | Hancock et al. | 701/201 |
| 6,295,528 | B1 | * | 9/2001 | Marcus et al. | 707/3 |
| 6,496,814 | B1 | * | 12/2002 | Busche | 706/21 |
| 6,577,714 | B1 | * | 6/2003 | Darcie et al. | 379/93.17 |
| 6,580,916 | B1 | * | 6/2003 | Weisshaar et al. | 455/456.1 |
| 6,594,666 | B1 | * | 7/2003 | Biswas et al. | 707/100 |

* cited by examiner

*Primary Examiner*—Greta Robinson
*Assistant Examiner*—Miranda Le
(74) *Attorney, Agent, or Firm*—Sansag Prasad

(57) ABSTRACT

A shareable application program interface infrastructure which is used in combination with a relational database to provide data storage and processing functions for location-dependent objects, and includes a mechanism for easily associating an object, such a service, with a geographic region, such as an area served by the service. The service designer is provided with a tool to choose a geographic region or a point location (specified by an address), and to associate that selected geographic region with a service. Each service is associated with a geographic region chosen from a hierarchy of predetermined system-defined regions that are preferably organized into a hierarchy composed of levels organized in order of decreasing size so that the boundaries of each child region lie within the boundaries of its parent region. The services designer is also provided with the option of creating "user defined regions" that are composed of existing system defined regions or a region centered around a selected location. The user-defined region could represent business objects that relate to a particular entity; for example, a set of sales regions served by different regional sales offices.

9 Claims, 2 Drawing Sheets

REGION MODELING OF MOBILE SERVICES

CROSS REFERENCE TO A RELATED APPLICATION

This application is a continuation-in-part of U.S. application Ser. No. 09/669,503 filed on Sep. 25, 2000 by Prabuddha Biswas and Raja Chatterjee, now U.S. Pat. No. 6,594,666 issued on Jul. 15, 2003.

FIELD OF THE INVENTION

This invention relates to methods and apparatus for associating geographic location information with clients and services, including particularly mobile clients and services.

BACKGROUND OF THE INVENTION

The decreasing cost and size of mobile computing and communications devices, and their increasing capabilities, contributes to the explosive growth in new mobile systems and applications. Laptop and handheld computers, as well as Personal Digital Assistants (PDA's) commonly use wireless communications to connect to a network of available services. At the same time, mobile and cellular telephones increasingly incorporate computing capabilities with Internet access. In the near future, most appliances will also incorporate communications interfaces for remote management. These advances, together with other technologies like "active badges" and inexpensive position sensing devices, will continue to increase the popularity of location-aware applications.

Many location-aware computer and communications already in use employ location-dependent data so that the geographic location of both service providers, their clients, and other entities can be taken into account for a variety of purposes. These applications include navigation, fleet management, resource location and mapping services, many of which are provided over the Internet. As Global Positioning System (GPS) devices and other positioning technologies become more accurate and less expensive, the number and variety of location-aware applications will continue to grow dramatically.

Today, when a mobile phone is used to access data services it connects to a portal site and it is presented a set of services. The user may sometimes have the ability to personalize his/her portal by choosing the set of services that are of interest. Mobile services available today are static; i.e., there is no location information associated with them. As a result, the same set of services are presented to the user irrespective of their location.

SUMMARY OF THE INVENTION

The above-noted U.S. patent application Ser. No. 09/669, 503 describes an infrastructure which may be used by disparate applications to support location-aware functions and data storage for both fixed and mobile entities. Location-dependent functions for fixed and mobile entities are described that employ different positioning systems, different input/output devices, and different networking technologies, while allowing these entities to more easily work together. In that infrastructure, location and context information which describes location-aware entities is stored in a secure, relational database system which allows authorized users access to appropriate information. More specifically, this application infrastructure provides mechanisms for specifying and modifying location-aware data objects stored in a relational database, for tracking the location of mobile objects, for responding to queries about the objects and the related data which defines those objects, for specifying events and for handling notifications concerning events, and for providing data caching and replication services which more rapidly process frequently used location information.

This infrastructure employs a database schema which employs client and service tables to store the current point location, and other data, representing virtual objects, including mobile objects. The infrastructure further includes a region table which contains data describing the geometry and characteristics of geographical regions having defined boundaries within which the client and service objects reside. For example, postal code boundaries may be one of the types of regions stored in the system. The clients store data indicating their interest in a set of services and that data is recorded in a client profile database table. The services available on the system which are position-dependent have a geographical location associated with them. The location information of services is also stored in the database repository. The location of the client is determined using positioning services and may be stored in a database. The last known location of the client as well as a past history of locations for each client is stored. To enhance performance, an additional table may be stored that maps the client's current location to one of the geographical regions (e.g. location of client within a postal code).

The present invention takes the form of a method for easily associating a service with a geographic region. The service designer has the option of using a graphical tool to choose a geographic region or a point location (specified by an address), and to associate that selected geographic region with a service. In accordance with a principle feature of the invention, each service is associated with a geographic region chosen from a hierarchy of predetermined geographical regions which are here called "system-defined regions" which are preferably organized into a hierarchy composed of levels comprising, in order of decreasing size:

---
Continent
    Country
        State
            Metropolitan area
            County
            Postal Code

---

In accordance with a further feature of the invention, the services designer is also provided with the option of creating "user defined regions" that are composed of existing system defined regions or a region centered around an address (e.g., 5 kilometers around One Oracle Drive, Nashua, N.H. 03062, USA). The user-defined region could represent business objects that relate to a particular entity; for example, a set of sales regions served by different regional sales offices.

These and other objects, features and advantages of the invention will become more apparent through a consideration of the following detailed description of a specific embodiment of the invention. In the course of this description, frequent reference will be made to the attached drawings.

DETAILED DESCRIPTION

Figure 1:
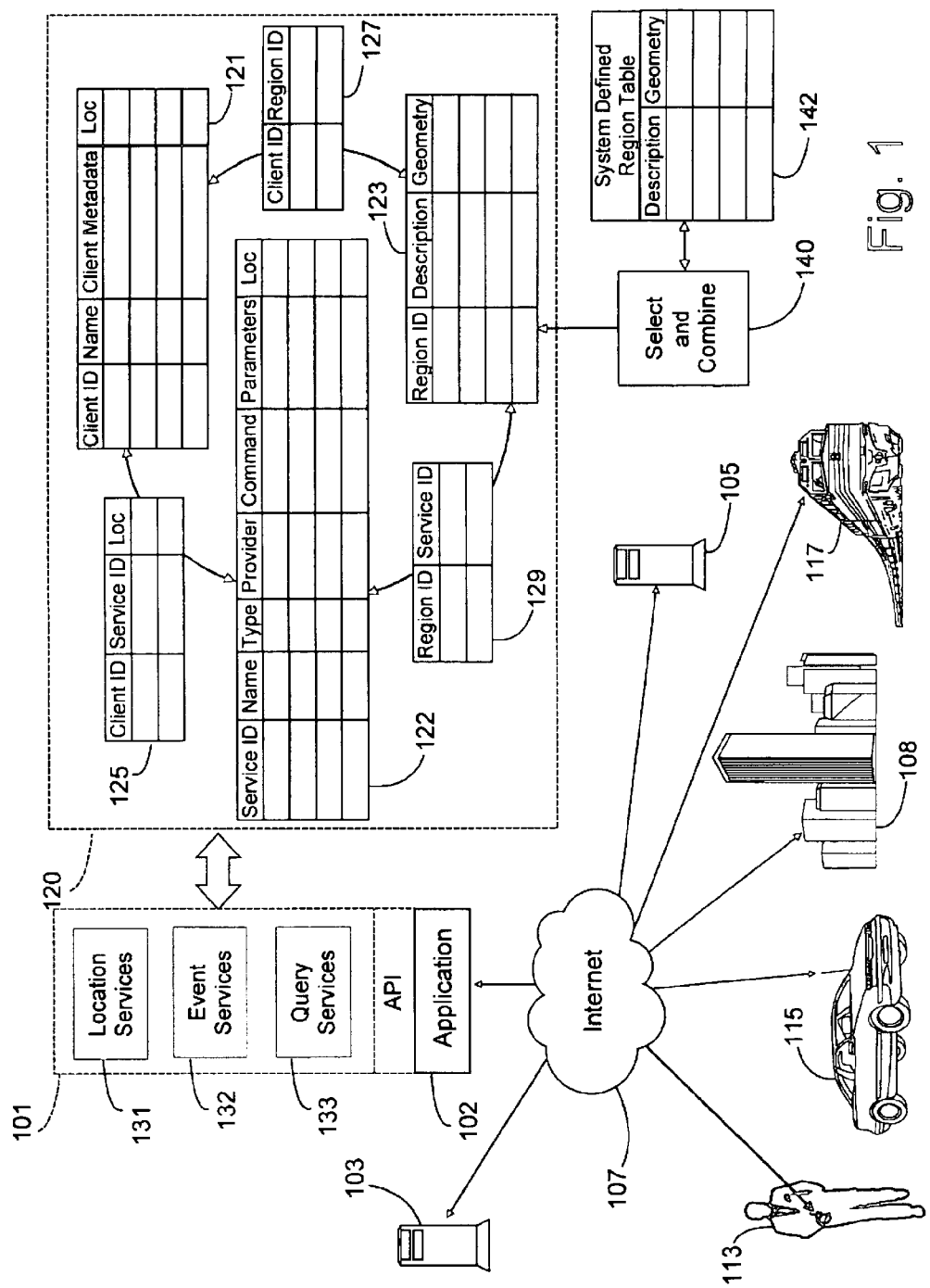
FIG. 1 is a conceptual diagram showing how both stationary and mobile clients and services are interrelated by location mapping data which interrelates their geographic locations in accordance with defined regions of interest.

The present invention may be implemented by using the infrastructure described in U.S. patent application Ser. No. 09/669,503. That infrastructure as seen at 101 in FIG. 1 provides data storage and functional capabilities to an application program 102 for providing services to, and facilitating communications between, a variety of stationary and mobile communications systems. For example, the infrastructure can be used with stationary "services" such as those provided by the Web servers 103 and 105, and stationary client systems, such as the appliances and computers located in an office building as illustrated at 108. Most importantly, the infrastructure contemplated by the present invention includes mechanisms for dynamically tracking the location of mobile systems, such as handheld PDAs, cellular phones, and laptop computers used by travelers as illustrated in FIG. 1 at 113, 115 and 117.

Each of these mobile and stationary systems may be represented in a relational database by a "virtual object" whose attributes are represented by a database schema as illustrated within the dashed line rectangle 120 in FIG. 1. The schema 120 includes a table 121 containing data regarding "clients," a table 122 containing data regarding "services," and a table 123 which stores data defining the attributes of "regions". The primary key fields, ClientID, ServiceID and RegionID of the tables 121–123 are used to create relationships which are defined by a Client_Service table 125, a Client_Region table 127, and a Service_Region table 129. These relationships may also be figured out dynamically instead of being permanently stored in database tables.

Each of the entities modeled by the schema 120 is specified by location data. The data in the LOC (location) column in the client table 121 and the service table 122 specify the current point position for each entity, and each region defined by the region table is specified in that table's geometry column which contains data specifying both the shape and location of the region. When no precise point data is available for a particular client in client table 121, the client can position himself manually with a location specified by an address or street intersection or associate himself with one of the regions available in the region table 123. Similarly, if no precise point data is available for a service specified in the service table 122, its position may be approximated by placing that service within one or more regions specified in the region table 123. Note also that, when precise point location data is available for a client or service, the point data can be matched against the regional geometry data in the region table to dynamically identify the regions that contain that client or service. For stationary client or service objects, these point-to-region comparisons may be done once and matches may be posted into the Client_Region table 127 or the service-region table 129 in advance, speeding subsequent processing. For mobile units, the location data is periodically or dynamically updated from the GPS/MPS (Mobile Positioning Service) data, or other available source, and the point-to-region matching may be mapped at update time, or dynamically when needed, at the option of the application program.

In order to simplify the task of associating specific clients or services with geographic regions, a set of system defined regions is preferably predefined, and the specific region associated with each entity is either a selected one of these predefined regions or a "user defined region". A user defined region is formed from a combination of system defined regions, or a region based on an address. This allows the user to employ a simple tool, seen at 140 in FIG. 1, for selecting one or more regions to be associated with a given client or service.

A table of system defined regions as illustrated at 142 is used to store definition data for each system defined region. In the implementation, table 142 can be implemented using a set of interrelated tables. The table 142 contains a human-interpretable description of each region (such as stored character data containing the text "Chicago Metropolitan Area", or a displayable descriptive image) and a definition of the geometry of that region, preferably expressed in a standard representation such as that used in Oracle Spatial, to be described below. The table 142 establishes a hierarchy of nested regions preferably consisting of the following levels:

Continent
    Country
        State
            Metropolitan area
            County
            Postal Code Because metropolitan areas may span across different counties and postal codes, they are kept at the same level as counties and postal codes. If metropolitan areas happen to cross two state boundaries, they will be put into both the states. In each case, each child region and its siblings at a given level resides within the extent defined by the geometry of the parent region.

The selection and combining tool 140 may take form of a visual control, such as a dialog box for displaying a hierarchical list of the system defined regions, that further permits the user to form a new, user-defined region by selecting a group of system defined regions. Thus, a region described as "The Chicago Metropolitan Region" may be formed by selecting counties in Illinois, Indiana and Wisconsin from the system defined region table, and the combining tool would automatically compute the geometry of the resulting user defined area using, for example, the spatial geometry manipulation tools in Oracle Spatial described below. The selection and combining tool 140 preferably includes means for presenting the descriptive portion of the system defined region data in the table 142 to the user in an easily navigable form, such as an expandable outline or set of nested folders of the type used to display hierarchical directory and file names in a file system.

The infrastructure 101, unlike existing location-aware infrastructures, includes facilities specifically adapted to handle mobile entities, such as mobile phones, PDA's and other hand held devices. These devices may include built-in GPS (Global Positioning System) receivers for continuously or periodically updating location data for that device which is stored in the client table 121 and associated with a Client ID key value. For details on the Global Positioning System and GPS receivers, see *Understanding GPS: Principles and Applications* by Elliott D. Kaplan (Editor), Artech House; ISBN 0890067937 (1996). In addition, Mobile Positioning Systems (MPS) incorporated into cellular phone systems provide a mechanism for periodically updating location information in the client table 121 for those devices. MPS technology is similar to the satellite-based Global Positioning Systems (GPS) but offers the additional capability of determining location inside buildings, parking garages and other shielded areas such as inside a pocket or briefcase that are inaccessible to GPS systems. MPS Mobile Positioning Systems for mobile phones are offered by Ericsson, Nokia, CellPoint,SnapTrack, Cell-loc, Cambridge Positioning System, etc.

The application program interface (API) of the infrastructure 101 provides location aware functionality to the application program 102, such as location services 131, event services 132 and query services 133.

The location services 131 permit the application program to map the location of mobile clients to the location of services or other clients within a specified region. Given any location, the infrastructure 101 can return to the application the identification of all mobile and stationary objects within a certain distance from that location. Given the identification of a particular mobile client, the infrastructure 101 can return an identification of all relevant services within a defined region where the mobile client is currently located. Given the identification of any region, the infrastructure can identify all of the clients and services, whether mobile or stationary, that are currently within that region and which have defined attributes.

The location services 131 are implemented in part by query services which are made available to the application 102 via the API presented by the infrastructure 101 These query services process location data which preferably specify the geographic "point" position of each object, when such precise data is available, or which approximates object positions by specifying defined regions which contain the objects. Preferably, this location data is stored in a standard format, such as that used by the locator feature in Oracle8i (or later) spatial geometry format, a component of the Oracle 8i™ database available from Oracle Corporation, Redwood Shores, Calif. Oracle Spatial and its extensions used with the Oracle8i Enterprise Edition (or later) product, provides an integrated set of functions and procedures that enables spatial data to be stored, accessed, and analyzed quickly and efficiently in an Oracle8i database. Oracle Spatial provides a SQL schema and functions that facilitate the storage, retrieval, update, and query of collections of spatial features in an Oracle8i database, and includes the following components:

a. A schema that prescribes the storage, syntax, and semantics of supported geometric data types;

b. A spatial indexing mechanism;

c. A set of operators and functions for performing area-of-interest and spatial join queries; and c. Administrative utilities.

For more detailed information, see *Oracle Spatial User's Guide and Reference,* Release 8.1.6, (Oracle Part No. A77132-01), 1997, 1999.

The Oracle8i Spatial products use the geocoding process for converting an address or street intersection information into a geographical location specified by a latitude and longitude. Oracle8i Spatial may be used to support web-based searches by proximity from a given location and is designed to facilitate tasks such as supplementing business information with a location attribute (latitude and longitude) and to perform distance queries, and to present a graphical representation of locations for easier visualization by users.

The location data in the client and service tables 121 and 122 may be accessed by relational database operations using locator to support queries based on a specified proximity to a given location. The geographical point locations in the client and service tables, can be readily associated with the region geometry data defined in business data tables as illustrated by the region table 123, such as data defining commercial regions (e.g., downtown, north end, airport, shopping center, subdivision), postal (zip) codes, telephone area codes, etc, or demographic regions. The point-to-geometry matching provided by standard operations on location data available in the RDBMS can then be used to build the linking relationship client-region and service-region tables seen at 127 or 129, or the client and service to region matching can be performed dynamically as needed. The proximity search capabilities provided by the RDBMS allow the user to readily locate clients and services which are near to any defined point, including the location of a particular client or service.

Oracle8i Spatial uses the Oracle8i extensible indexing framework. This mechanism allows domain-specific data to be indexed and retrieved in the same way as other native datatypes, such as text and number. In Oracle8i Spatial, an application can programmatically invoke the index functionality, which takes the table name and column name as inputs, and automatically builds a spatial index. Oracle8i Spatial provides a sophisticated engine for data validation, indexing, relate operator use, buffer generation, within distance query options, polygon Boolean operations, and so on.

When business data has been geocoded and indexed in accordance with the client/service/region schema used by the location-aware infrastructure, applications can query against it using proximity queries, such as permitting a mobile client to display the all ATM machines within a given radius of the mobile client's current location. The Locator__Within__Distance operator provided by Oracle8i Spatial takes column of geocoded points in a table (for example, a service table describing all ATM locations in North America), a geometry representing the point or region of interest, and a distance in some units (for example, three miles). If used within a SELECT statement as the WHERE clause, the query will produce all records that satisfy the spatial criteria. Three distance units are supported by this operator: MILE, FT, and METER. If a unit is not specified, a point location is assumed to define latitude and longitude in decimal degrees.

The region modeling utility provides a unique capability of making only those services available to the user that is pertinent to his/her location. In the mobile internet it is extremely important to highlight only the relevant services because of the limitation of the device display capabilities. If the user's current location is known, then we can find out all the services that are relevant by figuring out the regions (system or user defined) that interact with his/her location.

The event services component 132 of the infrastructure allows the user to specify events based on location and receive notification of events provided by the application 102 and its OS environment.

Figure 2:
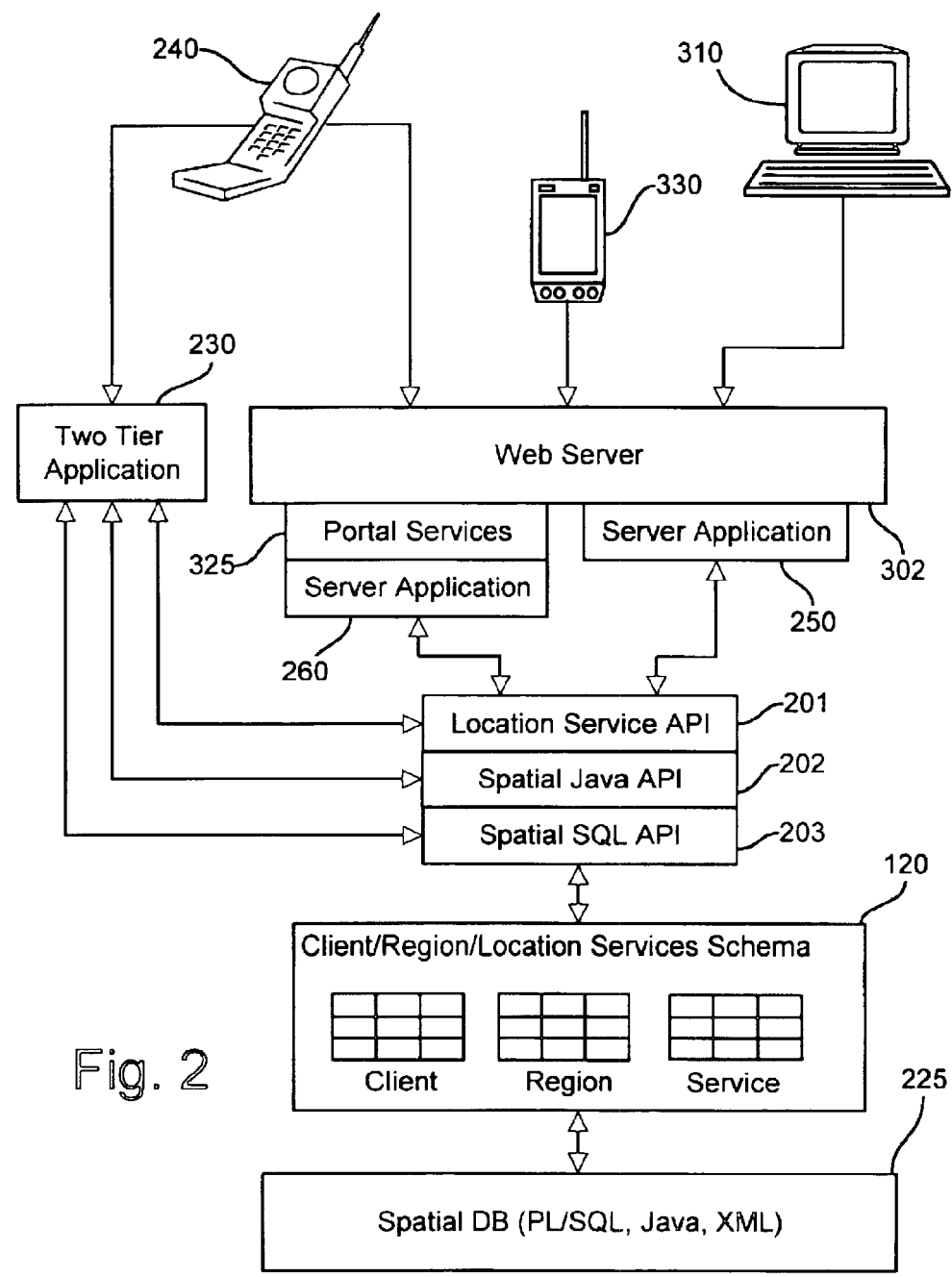
FIG. 2 is a schematic diagram illustrating the manner in which the location-aware infrastructure contemplated by the present invention interfaces with mobile and stationary computing systems and applications executed by these systems.

As illustrated in FIG. 2 of the drawings, location aware infrastructure may be used to advantage in combination with a multi-tier relational database system which provides Internet Web database server capabilities, such as the Oracle 8i, Oracle 8i Lite (for mobile applications), and Oracle *9iAS Wireless Edition.*

Oracle8i Lite, available from Oracle Corporation, provides a comprehensive suite of enterprise software to build, deploy, and centrally manage mobile enterprise applications that synchronize data with central database servers. Oracle 9iAS Wireless Edition is a server component of the Oracle Internet Platform that enables existing database and Internet applications to be made accessible from virtually any device connected to the Internet, including WAP smartphones, wireless PDAs such as the Palm VII product sold by 3Com, standard phones connected to Interactive Voice Recognition (IVR) systems, modem-equipped personal organizers, television set-top boxes, etc. Oracle 9iAS Wireless Edition provides an infrastructure which renders existing content (Internet, file system, or database applications) in a device independent fashion by extracting their output, dynamically converting it to an internal XML format and in turn to the mark-up language supported by the user's device, including WML, TinyHTML, and voice mark-up language (VoxML). Using 9iAS Wireless Edition, mobile operators, content providers, and wireless ISPs may create their own wireless portals, and existing enterprise systems may be seamlessly extended to reach mobile users.

The location-aware infrastructure contemplated by the present invention may be used to extend the capabilities of relational database products like those noted above by extending the database API to provide location aware data, event and query services to applications. These location aware functions are preferably implemented as extensions to the existing Java Location API seen at in FIG. 2, and to the SQL Location API seen at 204. The Java Location provides a Java object view of the data and functions implemented by the database schema 120, while the SQL Location API allows applications to manipulate the database using conventional PL/SQL statements and procedures, and to treat clients, services and regions as objects in the object relational database.

The location data values are stored in the database tables as shown at 120 in accordance with the client/service/region schema. The location data is preferably processed using the database system's standard geometric data handling functions and queries, such as those provided by Oracle Spatial as discussed above, as illustrated at 225.

The application programs that utilize the infrastructure may take a variety of forms. An application program operate in a "two-tier" architecture in which the application program, seen at 230 in FIG. 2, directly communicates with a mobile or stationary device, such as the cellular phone shown at 240, and makes direct calls to the infrastructure using the location server API 201, the Java API 202 and/or the SQL API 203. Other applications providing location-dependent functions may be readily integrated into a multi-tier architecture as indicated at 250 and 260 in FIG. 2. The application at 250 operates as a server application in the environment provided by the Web server 302, using the Web server's HTTP protocol to exchange information with conventional Web browser programs and the like, as illustrated by the desktop client Web client seen at 310. The application program seen at 260 employs the special services of gateway/portal services shown at 325, such as the Oracle 9iAS Wireless Edition infrastructure discussed earlier, which permit the application 260 to effectively communicate with devices such as the handheld PDA seen at 330.

Both applications 250 and 260 may also make use of a set of additional location services which are presented via the Location services API seen at 201 in FIG. 2. This API exposes ancillary services, including modeling tools for specifying and modifying geometries which are stored using the schema 120, location tracking and management functions, including the ability to receive and update dynamically changing location data representing mobile objects, event services, and data pre-fetching, caching and replication services which permit frequently used data to be processed more efficiently. The location services API 201 provides an architectural framework which makes scaleable location aware data storage and processing functions available to variety of disparate applications, reducing the time and effort needed to develop new location aware applications by eliminating redundant develop efforts while encouraging data and process standardization and sharing by presenting a common interface.

It is to be understood that the specific embodiment that has been described is merely illustrative of one application of the principles of the invention. Numerous modifications may be made by those skilled in the art without departing from the true spirit and scope of the invention.

What is claimed is:

1. Apparatus for performing location-dependent data processing operations comprising, in combination, a relational database management system for creating and updating data structures comprising a first set of one or more relational tables describing objects, said data structures including means for storing data specifying the geographic location of at least selected ones of said objects;

means for storing reference data in a second set of one or more relational tables describing a plurality of system defined regions, said reference data including the specification of the geographic location of each given one of said system defined regions and a human interpretable description of each given one of said regions;

a user-manipulated control, comprising:
means for visually displaying to a user said human interpretable description for said system defined regions,
means for accepting from said user an identification of a plurality of system defined regions,
means for generating the specification of a new user defined region consisting of the combination of said plurality of system defined regions,
means for storing reference data describing said new user defined region in said second set of tables,
means for identifying a selected one of said regions described in said second set of tables, and
means for transferring data specifying the geographic location of said selected one of said regions to said first set of tables to specify the geographic location of a specified one of said objects; and means responsive to said control for transferring selected items of said reference data to said means for storing geographic location data associated with one of said objects.

2. Apparatus as set forth in claim 1 wherein said means for storing reference data includes means for storing said reference data in a hierarchy of regions.

3. Apparatus as set forth in claim 2 wherein said hierarchy of regions consists of a parent-child hierarchy of levels holding regions of decreasing size characterized by each child region having a geographical extent the lies within the geographical extent of its parent region.

4. Apparatus as set forth in claim 2 wherein said reference data defines the boundaries of each of said regions and wherein any first region having defined boundaries within the boundaries of a region is nested within said second region within said hierarchy.

5. A method for performing location-dependent data processing operations comprising, in combination, the steps of:

creating and updating data structures describing objects in a first set of tables in a relational database management system, said data structures including data specifying the geographic location of at least selected ones of said objects;

storing reference data describing a plurality of system defined regions in a second set of tables in said relational database system, said reference data including the specification of the geographic location of each given one of said system defined regions and a human interpretable description of each given one of said system defined regions;

employing a user-manipulated control for performing the substeps of:
 visually displaying to a user said human interpretable description for said system defined regions,
 accepting from said user an identification of a plurality of system defined regions,
 generating the specification of a new user defined region consisting of the combination of said plurality of system defined regions,
 storing reference data describing said new user defined region in said second set of tables,
 identifying a selected one of said regions described in said second set of tables, and
 transferring data specifying the geographic location of said selected one of said regions to said first set of tables to specify the geographic location of a specified one of said objects; and
 transferring said reference data describing said new user defined region to said data structures to associate said new user defined region with one of said objects.

6. The method set forth in claim 5 wherein said data structures describing objects are relational tables describing one or more services each having a geographic location serving one of said system defined regions or one of said user defined regions.

7. The method set forth in claim 5 wherein said step of storing reference data includes the step of storing said reference data in a hierarchy of regions.

8. The method set forth in claim 7 wherein said hierarchy of regions consists of a parent-child hierarchy of levels holding regions of decreasing size characterized by each child region having a geographical extent the lies within the geographical extent of its parent region.

9. The method set forth in claim 7 wherein said reference data defines the boundaries of each of said regions and wherein any first region having defined boundaries within the boundaries of a region is nested within said second region within said hierarchy.

* * * * *

UNITED STATES PATENT AND TRADEMARK OFFICE
CERTIFICATE OF CORRECTION

PATENT NO.         : 6,954,764 B2                                        Page 1 of 1
APPLICATION NO.    : 09/870301
DATED              : October 11, 2005
INVENTOR(S)        : Biswas et al.

It is certified that error appears in the above-identified patent and that said Letters Patent is hereby corrected as shown below:

In column 5, line 53, delete "c." and insert -- d. --, therefor.

In column 7, line 24, after "at" insert -- 202 --.

Signed and Sealed this

Ninth Day of March, 2010

David J. Kappos
*Director of the United States Patent and Trademark Office*